United States Patent [19]

Dabbs

[11] Patent Number: 5,075,680
[45] Date of Patent: Dec. 24, 1991

[54] METHOD AND APPARATUS FOR MONITORING VEHICULAR TRAFFIC

[76] Inventor: John W. T. Dabbs, 115 Claymore La., Oak Ridge, Tenn. 37830-7675

[21] Appl. No.: 583,560

[22] Filed: Sep. 14, 1990

[51] Int. Cl.$^5$ .................. G01S 13/86; G01S 13/91; G08G 5/00; H01Q 1/00

[52] U.S. Cl. ................................ 342/52; 342/36; 343/720; 343/781 CA; 340/952

[58] Field of Search ............... 342/36, 52, 69; 343/781 CA, 781 P, 720, 725, 729; 340/947, 952, 959

[56] References Cited

U.S. PATENT DOCUMENTS

| | | | |
|---|---|---|---|
| 2,539,593 | 1/1951 | Rines | 343/720 X |
| 3,181,150 | 4/1965 | Ruppersberg et al. | 342/69 X |
| 3,838,421 | 9/1974 | Dasse-Hartaut et al. | 342/36 |
| 4,635,058 | 1/1987 | Sutphin, Jr. | 342/52 |
| 4,866,454 | 9/1989 | Droessler et al. | 343/725 |

*Primary Examiner*—Gilberto Barrón, Jr.
*Attorney, Agent, or Firm*—Luedeka, Hodges, Neely & Graham

[57] ABSTRACT

A method and apparatus for monitoring moving vehicular traffic, especially adapted for the detailed profiling and counting of airport usage by aircraft employing Doppler radar and sound generated by target aircraft. A primary parabolic reflector operated in the Cassegrainian mode with respect to Doppler radar radiation, employed in combination with a hyperbolic sub-reflector constructed so that it will reflect the radar radiation but remain transparent to sound waves is used to propagate and receive radar radiation, and to receive sound waves emanating from a target aircraft. Sound waves emanating from the target are received by the parabolic reflector and directed toward the parabolic reflector's primary focus where they strike a microphone placed at the primary focus of such reflector. The signal from the microphone and the information from the Dopple radar unit are processed by a central processing unit to provide a variety of information relating to the aircraft.

13 Claims, 3 Drawing Sheets

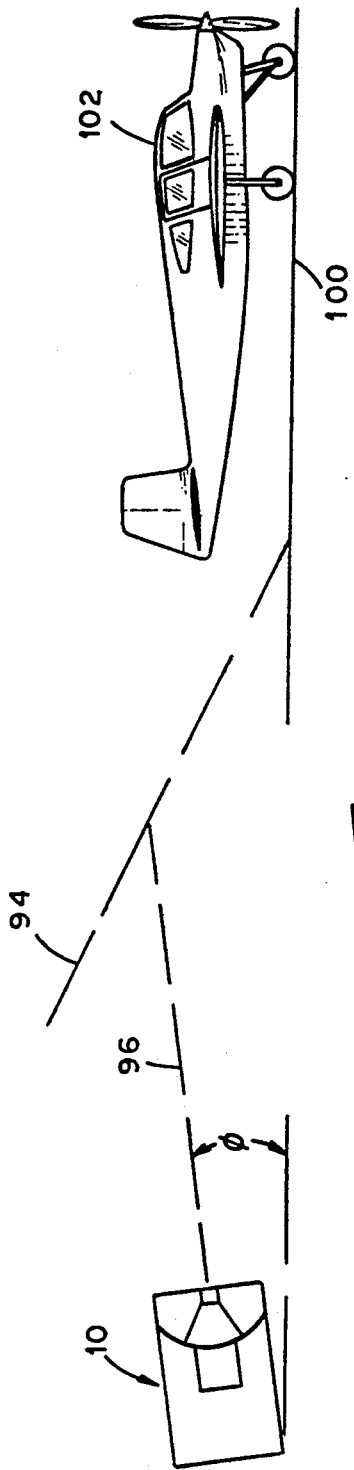
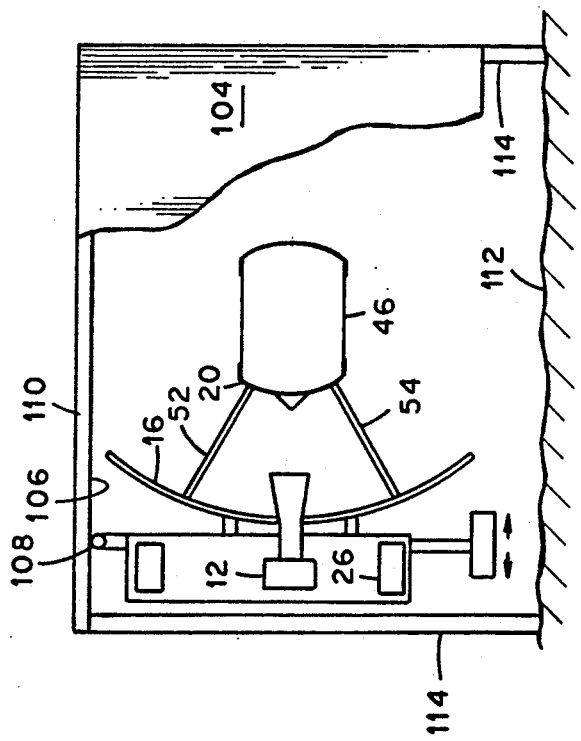
Fig. 3
Fig. 4

METHOD AND APPARATUS FOR MONITORING VEHICULAR TRAFFIC

FIELD OF THE INVENTION

This invention relates to the monitoring of moving vehicles, and, more specifically, the detecting, counting and other analysis of air traffic operating at airports without control towers.

BACKGROUND OF THE INVENTION

Federal and state regulations, for a variety of reasons, require that traffic information from airports without control towers be provided. Such information is useful in allocating funds, determining traffic use patterns, law enforcement, noise control, etc.

To date, there have been two primary methods for determining traffic at such airports, namely: (1) estimation of the traffic by the airport manager or (2) spot checking the traffic for a period of time. Both such methods have inherent drawbacks. First, if the information gathered is to be used to decide the allocation of funding, which is in turn dependent upon the volume of traffic, airport managers are not likely to want to deprive their airports of funds and may be prompted to provide the highest possible estimation of air traffic using their airport. Second, human surveyors of aircraft traffic at isolated airports are subject to distraction and inattention to their task, partly due to boredom. Also, human surveyors are commonly used for only "spot checking" which is inherently inconsistent and introduces error when the survey results are extrapolated to provide some type of total traffic count.

For spot checking over longer periods, or for continuous use, "automatic" counting devices such as those used on highways to count traffic can determine the total number of airplanes using a particular runway. Such devices, such as a "road-tube" laid across a taxiway at an airport where traffic is to be counted to record the event every time a vehicle runs over the road tube, include several drawbacks such as (1) aircraft land at a variety of positions on the runway and it may be that not every aircraft would run over the cable and (2) such simple counting methods provide only the total number of vehicles running over the road tube and provide no information as to the type of use the vehicle was making of the airport nor whether the vehicle was an automobile or an aircraft. Information such as, did the aircraft land, take off, or shoot a touch and go, directional information, and type of aircraft are not obtainable by such devices but such information is helpful in describing the overall traffic usage pattern at a particular airport.

Another "automatic" airport traffic monitoring device, which has been used for a number of years, comprises a recording device box, a cable, a battery, and a microphone located to one side of, and near the middle of, a runway. Particularly loud sounds, such as from an airplane taking off, trigger a sound recording device, such as a cassette tape recorder, which records a segment of tape for a period of a few seconds; an electromechanical counter is also advanced by one count. Hourly and semi-daily "beeps" are also recorded on the tape. The analysis of the airport traffic is accomplished by a person, trained in the art, who listens to the sound segments and decides whether it was an aircraft, with some information about aircraft type based on the quality of the sound. Barking dogs and fire engines are easily eliminated. The method requires extremely close attention because the sound segments are very close together in time, leading to fatigue and boredom for the sound interpreter.

SUMMARY OF THE INVENTION

In accordance with the present invention, a substantial variety of information is gathered relating to the aircraft traffic especially at unattended airports, that is, at airports which either have no control tower or the like, or which have a tower that is unmanned at certain hours and/or days. The present apparatus operates automatically in a "stand alone" (i.e. unattended) mode and comprises a unique combination for simultaneously collecting radar and sound radiation from a target aircraft, including a primary parabolic reflector operated in the Cassegrainian mode having a central aperture through which there extends a Doppler radar horn which directs radar radiation toward the focus of the primary parabolic reflector, a hyperbolic sub-reflector that is spaced apart from the primary reflector and oriented with its center located in line with the focus of the primary parabolic reflector, and its curvature extending in the same general direction as the curvature of the primary reflector, a microphone located at the focus of the primary parabolic reflector, means for detecting reflected doppler-shifted radar radiation from moving target aircraft, and means for analyzing both the detected sound and reflected doppler-shifted microwave radiations to provide useful information. By design, the hyperbolic sub-reflector is made transparent to sound waves, but reflective of radar radiation such that its reverse surface serves to direct radar radiation from the radar horn rearwardly to the primary parabolic reflector, thence outwardly in a collimated beam toward the target area, and simultaneously to direct radar radiation reflected from the target aircraft to the primary parabolic reflector, thence to the reverse surface of the hyperbolic sub-reflector, thence back into the horn for detection of such reflected radiation. Analysis of the detected sound and the reflected radiation provides the basis for determining valuable information relating to the aircraft traffic, such as, a count of events (takeoffs, landings, etc.) and/or the speed, direction, frequencies of engine noise, volume of engine noise, and other information relating to the target aircraft.

In accordance with the method of the present invention, there is generated radar radiation that is directed outwardly toward a target area, but which is intercepted by the reverse surface of a hyperbolic sub-reflector and reversely reflected to a primary parabolic reflector from which the radiation is redirected toward the target area in a collimated beam. Doppler-shifted radar radiation reflected from a moving target aircraft is reflected back substantially along its original outward path to be received and detected. Simultaneously, sound waves from the target aircraft are received at the primary parabolic reflector and directed to a microphone located at the focus of such primary parabolic reflector, such transmission of the sound waves being made possible by the sound transparency of the hyperbolic sub-reflector. These sound waves are detected by the microphone and converted into a representative electrical signal which is directed to a computer (central processing unit), along with the detected reflected radar radiation information, for analysis, storage, etc.

In a preferred embodiment, the first microphone is protected from transient sound waves by means of selected shielding and by reason of its physical location at the focus of the primary parabolic reflector.

In a preferred embodiment of the present invention, a parabolic primary reflector is used for the propagation and reception of radar radiation and the reception of sound waves. The reflector is operated in the Cassegrainian mode for the propagation of the radar and sound reception occurs, substantially simultaneously, at the focus of the reflector. In operation, radar radiation emanates from a radar feed horn extending through an aperture located in the center of the parabolic reflector. The radar signal is then reflected from a hyperbolic sub-reflector back to the primary parabolic reflector. From the primary reflector, a substantially collimated signal is directed away from the reflector towards a target.

The radar wave then strikes a target and is reflected back towards the apparatus. Signals which are reflected back to the primary reflector are reflected to the hyperbolic sub-reflector and, from there, are reflected back to the radar feed horn. The reflected signal is then analyzed for Doppler shifts due to the velocity of the target in ways well known to those familiar in the art of Doppler radar design.

Importantly, the primary reflector is also used as a sound gathering and focusing device at the same time it is being used to propagate and receive the Doppler-shifted radar radiation. Sound emanating from the target strikes the primary reflector and is directed toward its focus (and, consequently, toward the sub-reflector). However, due to a perforated design, the sub-reflector appears substantially transparent to sound waves while remaining reflective of the radar radiation. Therefore, the sound waves are concentrated at the focus of the primary reflector. A first microphone is placed at the focus to convert the sound into an electronic signal which may be used in a variety of ways.

By way of example, the Doppler radar radiation may be used to determine the strength of reflection by the target, speed of the target, and, by difference, acceleration of the target, and by sums, the distance travelled by the target. The sound information is useful in counting traffic events and the strength of the sound (loudness), its frequency, and its amplitude characteristics are useful in identification of the vehicle and other uses. By combining the above detailed information, a profile of each target may be generated which will allow the determination of whether the detected traffic use was a landing, takeoff, or touch and go, for example. Therefore, not only is a simple count of traffic determined, but the type of usage is determined as well. Also the profile information is useful to determine the type of aircraft (light, medium or heavy) and may be further used to identify the aircraft as being in a subdivision within a given type.

It is therefore an object of the present invention to monitor vehicular traffic. It is another object of the present invention to detect, count and/or otherwise gather information relating to aircraft making use of an airport. It is another object of the present invention to simultaneously monitor sound emanating from, and provide selected information regarding such vehicles.

BRIEF DESCRIPTION OF THE DRAWINGS

A more complete understanding of the present invention may be had with reference to the following drawings and detailed description in which

FIG. 3 is a perspective view showing a monitor in accordance with the present invention as used at an airport for monitoring aircraft traffic, and FIG. 4 is a representation of one embodiment of superstructure for mounting a monitor in position for use.

DETAILED DESCRIPTION OF A PREFERRED EMBODIMENT

Figure 1:
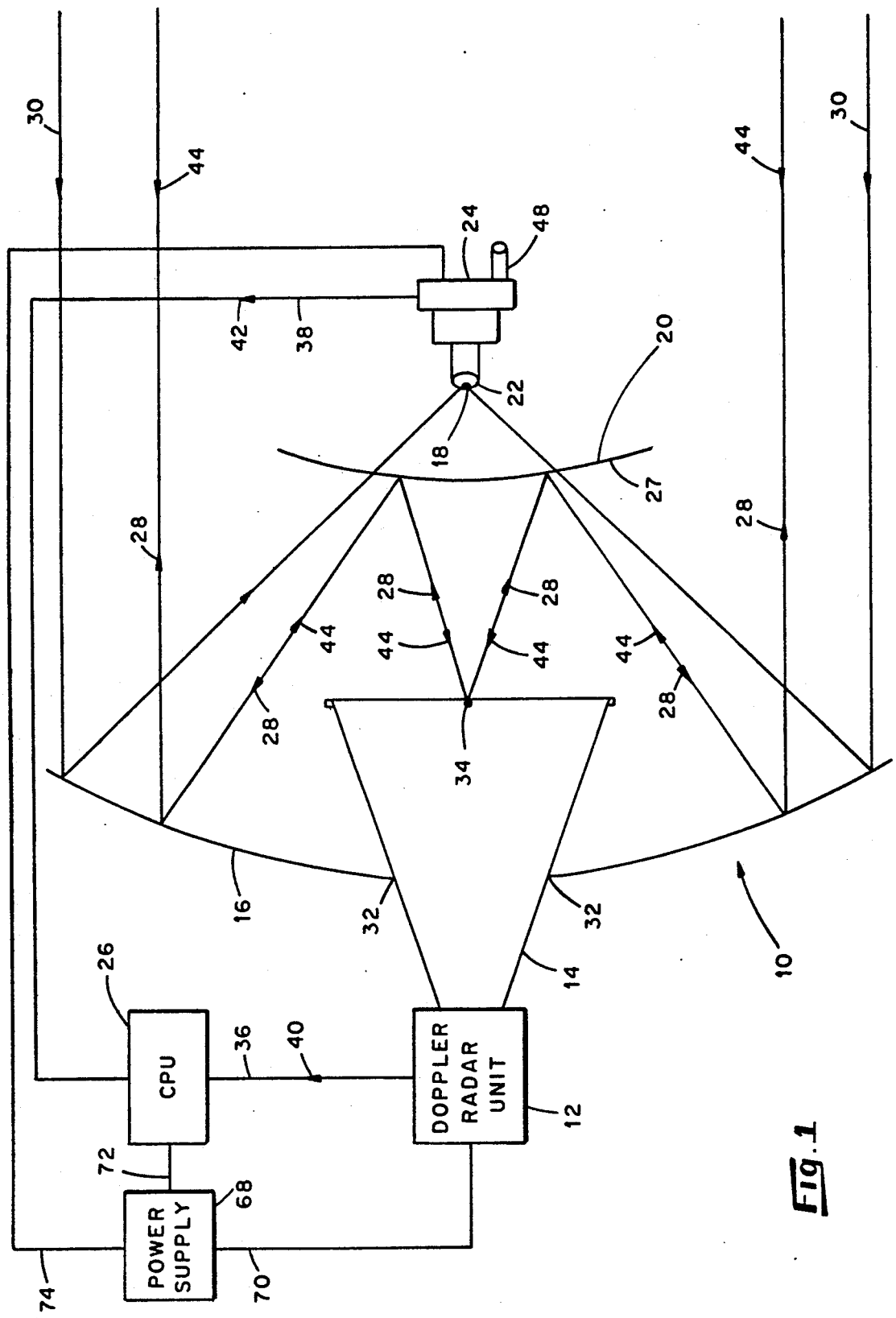
FIG. 1 is a simplified schematic of one embodiment of a monitor for vehicular traffic and embodying various features of the invention.

There is shown in FIG. 1 a simplified schematic of a preferred embodiment traffic monitor 10. The depicted device utilizes two means to gather data on target aircraft, namely, Doppler-shifted radar radiation 44 and sound waves 30 emanating from the target. Radar radiation 28 is generated by a radar unit 12 and is propagated into the atmosphere by a feed horn 14 which projects through a central opening 32 in a primary parabolic reflector. As the radiation 28 departs the feed horn 14 it strikes the reverse surface 27 of a hyperbolic sub-reflector 20 and is reflected back to the primary reflector 16.

The primary reflector 16 is operated in the Cassegrain mode with respect to radar radiation 28. There is provided at its center an aperture 32 through which the feed horn 14 extends. This feed horn 14 is positioned such that the source of the radar radiation is at the Cassegrain focus 34 of the system defined by the primary reflector 16 and sub-reflector 20. The geometry and other descriptive information relating to Cassegrain-type antennas is found in Antenna Engineering Handbook, 2d Ed., (1984), Johnson and Jasik, Editors, which is incorporated herein by reference. Particular attention is invited to pp. 30-6 to 30-21 of this publication.

In this manner, radar radiation 28 departing the monitor 10 leaves as a collimated beam and has an extended range. The microwave radiation 28 strikes a target aircraft (not shown in FIG. 1) and a portion of the microwave radiation 44 is reflected back toward the primary reflector 16. That portion of the radiation 44 so reflected, is reflected from the primary reflector 16 to the sub-reflector 20 and thence towards the Cassegrainian focus 34. In such manner, the radiation 44 reenters the feed horn 14 and returns to the Doppler radar unit 12. The Doppler radar unit 12 analyzes the reflected radiation 44 and determines several parameters such as the strength of the reflection and the velocity of the target. Such information is converted into electronic signals 40 which is transmitted along leads 36 to a central processing unit (CPU) 26 for further analysis or storage.

It should be recognized that the outgoing microwave radiation 28 is generated in bursts of limited duration so that the Doppler radar unit 12 is able to receive and analyze reflected radiation 44 into, e.g., separate velocity and intensity values related to each burst, and thus to provide a time pattern of speed and intensity for the target.

At the same time as the monitor 10 is probing the target with radiation 28, sound 30 emanating from the target is also being received by the primary reflector 16.

The sound waves 30 received by the primary reflector 16 are focused toward the primary reflector's focal point 18. Sub-reflector 20, by reason of its construction, is transmissive of sound so that sound 30 received by the primary reflector 16 is not reflected by the sub-reflector 20. Rather, such sound 30 proceeds to the focal point 18. A microphone 22, placed at the focal point 18, converts the sound 30 into an electrical signal which proceeds to a circuit board 24 that includes an amplifier (not shown). The electronics of the circuit board 24 control the microphone 22 and the signal generated thereby.

Proximate to, but separated from the first microphone 22 as by a baffle plate which may also be the circuit board 24, there is provided a second microphone 48. In accordance with the depicted embodiment, this second microphone 48 is positioned to receive sound waves directly from the environment external to but surrounding the monitor 10. In a preferred embodiment, the output from the two microphones 22 and 48 are independently fed to amplifiers (not shown) contained on the circuit board 24. By design, when the sound waves picked up by the first microphone are substantially equal in overall intensity to the sound waves picked up the second microphone, their input signals to the two amplifiers are substantially equal. The output from the two amplifiers is directed to a differential amplifier (not shown) on the circuit board 24. When the two microphone signals are substantially equal, there is no material output from the differential amplifier, hence the output of the system is low. The output signals from this system are transmitted to the CPU 26. With the two microphones receiving substantially the same sound, there is little net signal from the two microphones. On the other hand, when sound from a target aircraft is picked up by the primary reflector 16, concentrated and focused upon the first microphone, the output of such first microphone is substantially greater than the output of the second microphone such that there is generated an output signal from the differential amplifier, thereby resulting in predominance of the output signal from the first microphone and transmission of such amplified signal to the CPU. By means of the aforedescribed combination of two microphones, the present inventor provides for the subtraction of extraneous noise from the sound waves striking the primary reflector 16 and picked up by the first microphone 22, which it will be recognized includes both extraneous sound waves and sound waves emanating from the target aircraft, thereby providing a more truly representative sound wave pattern for analysis.

Analysis of the sound 30 by the CPU yields a variety of data such as the loudness of the sound emanating from the target and the frequency profile of the sound generated by the target.

Based upon the information provided from the Doppler radar unit 12 and the microphone control circuit board 24, the CPU 26 is employed to determine the nature of the operations of the target aircraft. For example, by monitoring changes in the speed of the aircraft and variation in the loudness of the sound emanating from the aircraft, the CPU 26 can determine whether the aircraft was landing, taking off, or shooting a touch-and-go landing, and what direction the aircraft was going. Additionally, the CPU 26 can keep a count of each individual operation at the airport by storing the above described information in memory. With the CPU 26 having a on-board clock, such information can be referenced to a particular time period. Upon retrieval of such information, a detailed profile of the operations of aircraft in an airport can be described without the error inherent in human surveyors or estimates.

A profile will provide information as to how many air operations occurred in a given time period, what type of operation each individual profile represented, and how such operations were distributed in time. Such detailed information would allow for more accurate planning of new airport construction, distribution of government funding based upon usage, in zoning and operations restrictions for noise control; these being but a few of the applications for this type of technology and data. It should be noted that this level of detail, especially such items as relative usage of the runway in its two directions or time distribution of traffic is not recorded even at tower controlled airports; therefore this invention can provide additional useful information on traffic at such airports. Relative usage of a runway in its two directions is important in determining the "noise footprint" over distances of miles from the airport.

Figure 2:
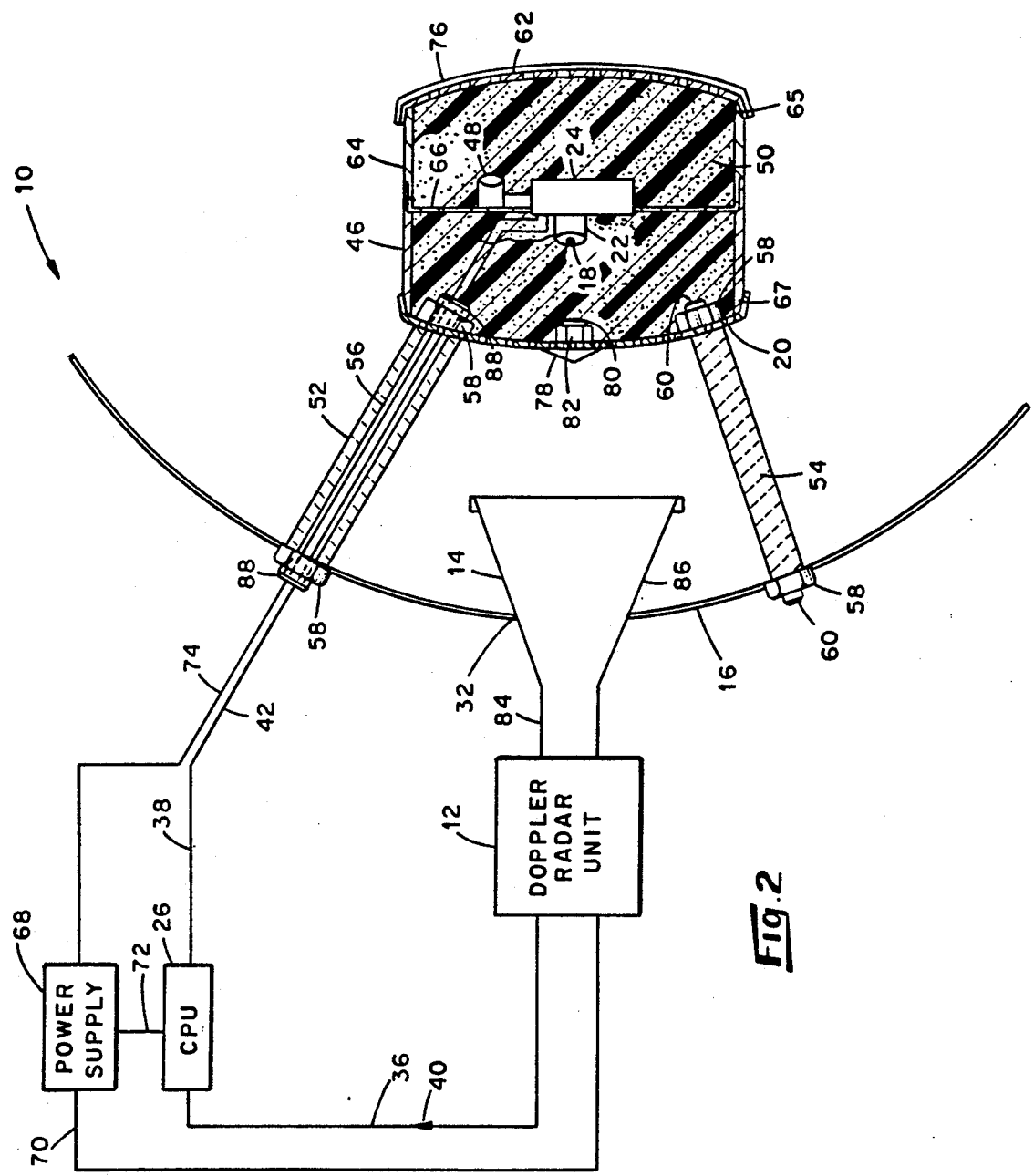
FIG. 2 is a detailed schematic showing additional features of the monitor depicted in FIG. 1.

A more detailed schematic of a preferred embodiment of the present invention is given in FIG. 2. For the sake of clarity, the optical paths shown in FIG. 1 have been deleted but are the same for the embodiment of FIG. 2. The basic elements of FIG. 2 are identical to those described in FIG. 1; the Doppler radar unit 12, the feed horn 14, the primary reflector 16, sub-reflector 20, microphones 22 and 48 and CPU 26 operate as previously described.

In the embodiment depicted in FIG. 2, the horn 14 is constructed of spun aluminum and has a diameter of 3.29" at its open end. The base 84 of the depicted horn 14 is cylindrical with an inner diameter of 0.79" with the cylindrical portion extending for approximately 1.124". The front portion 86 of the depicted horn 14 is conical and extends for 3.024" beyond the back portion 84. The inner diameter of the front portion 86 ranges from 0.79" at the back to 3.29" at the front. This geometry provides for a feed horn angle of approximately 40°. The base 84 of the horn 14 is mounted on an appropriate superstructure (not shown) and its conical portion 86 extends through the aperture 32 of the primary reflector 16 for a distance of approximately 1.56".

The radar unit 12 is attached to the base portion 84 of the feed horn 14 and supplies the outgoing bursts of radar radiation 28, and also analyzes the reflected radiation 44 as described previously. A preferred radar unit 12 is a modified version of the transceiver ("antenna") portion of Model K-15 police traffic radar manufactured by MPH Corporation of Owensboro, Ky., and gives a radar frequency of 10.525 GHz (X-band). Modifications include a smaller horn as described above, and circuits modified to allow shorter bursts of radar to be produced. The preferred timing is a burst lasting 46 ms; counts of the doppler frequency for this time, with 10.525 GHz radar frequency, give speeds of the target directly in feet per second. Thus summation of such counts, if taken at one second intervals, give a close approximation to distance the target has travelled, for example. Acceleration is readily obtained in feet per second per second by simple subtraction of successive speeds, if taken at one second intervals. These relations are advantageous in computer manipulation of this information.

The primary reflector 16 has a focal length of 7.06" and a diameter of 18". It may be metal or constructed from metal coated plastic.

The depicted hyperbolic sub-reflector 20 is made of aluminum 6061 spun on a form that provides the proper geometry. In the depicted embodiment, the reverse surface 27 of the sub-reflector 20 is located 5.43" from the primary reflector 16. The sub-reflector 20 is made transparent to sound waves by drilling a plurality of 13/32" holes through its thickness. The sizing of the holes is such that the surface 27 appears totally reflective to the primary microwave radiation wave length but is transmissive of sound waves and of higher harmonics of the radar frequency. The radius of the sub-reflector 20 is 2.5". The mathematics for calculating proper dimensions and spacing of the horn, primary reflector and sub-reflector are given in the aforelisted Antenna Engineering Handbook.

As depicted, the sub-reflector 20 is the front cover of a sub-reflector assembly 46 which comprises a length of 5" outer diameter aluminum pipe 64 which has tapered ends 65 and 67. The perforated sub-reflector 20 provides one cap for the assembly while another perforated aluminum cap 62 closes the other end of the pipe 64. In this way a spare subreflector is available in the field by exchanging end caps. A thin plastic wrapping film is, in one embodiment, applied as a coating over the end caps of the assembly to prevent entry of moisture from the atmosphere into the assembly and consequent damage to the microphone circuitry. Such moisture could also block the fine pores in the foam and cause severe acoustic losses. The interior of assembly 46 is filled with Fine Porosity Scott Industrial foam 50 which serves to reduce wind noise entering the sub-reflector assembly 46. Cutouts in the foam 50 provide mounting for the first microphone 22 located at the focal point 18 of the primary reflector 16 and an associated circuit board 24. An additional cutout allows for the placement of a noise-cancelling second microphone 48. A plastic ring 66 with a diameter smaller than the inner diameter of the pipe 64 is used to properly locate the acoustic foam 50 so that the parts mounted inside the foam are properly positioned. This ring, together with the circular circuit board 24, provides an acoustic baffle between microphone 22 and microphone 48. As a further feature, the acoustic foam provides a shock mount for the electronic components mounted therein. In addition, a conductive spray is applied to the foam surface behind the subreflector, which absorbs radar higher harmonics.

Due to possible direct reflection of outgoing radar radiation back into the feed horn 14 from the center of the sub-reflector 20, a reflecting cone 78 is placed in the center of the sub-reflector 20. In order that the radar radiation striking the cone 78 not be reflected back into the feedhorn 14, the cone 78 is provided with a geometry such that the cone angle $\theta$ will deflect radiation beyond the feed horn and to the primary reflector 16. For the geometry of the preferred embodiment this cone angle is 21°. The cone 78 may be constructed of solid metal, preferably aluminum, with an attached bolt 80. The bolt extends through the sub-reflector 20 and is secured by a nut 82.

The noise cancelling microphone 48 is mounted facing in an opposite direction than, and preferably is offset from, the microphone 22 at the focal point 18. This noise cancelling microphone 48 is used in conjunction with the first microphone 22 to provide a noise cancelling feature. As noted, both microphones 22 and 48 have their associated signals picked off and input into amplifiers located on the circuit board 24. When the output of both microphones is constant, as when the same sound level is reaching both microphones, the differential amplifier will reflect the equilibrium and subsequently cause the output of this amplifier contained on circuit board 24 to remain low. On the other hand, when the primary reflector 16 is receiving sound from a target, such sound will be focused at the focal point 18. Under these circumstances, the microphone 22 will have a much greater output than the noise cancelling microphone 48. This difference in output between the two microphones will be reflected in the output of the differential amplifier contained on the circuit board 24. The increased output of the amplifier represents primarily the signal from the microphone 22 which is sent to the CPU 26. Thus, the overall operation of the noise cancelling microphone 48 prevents sounds that are not being received by the primary reflector from being sent to the CPU 26. This noise cancelling feature reduces error due to sources of noise which are not targeted aircraft.

The sub-reflector assembly 46 of the depicted embodiment is held in position by a tripod arrangement of tubes 52 and 54 and a further tube which is identical to tube 54 but is not shown because of the perspective of the drawing. Each tube 54 and 52 is made of G10 fiberglass which is substantially transparent to microwave radiation. The rods are spaced radially equidistant, preferably about 3-¼", from the center of the primary reflector 16 and about 2" from the center of the sub-reflector 20 which allows the ends of the tubes 52, 54 and the one not shown, to be approximately perpendicular to both the surface of the primary reflector 16 and the surface of the sub-reflector 20 for mounting purposes. All of the tubes are 5.477" in length.

For the tube not shown and tube 54, a nylon screw 60 is tapped into each end of the rod which provides for securing the primary reflector 16 and the sub-reflector 20 to these rods. Each screw is placed through a hole at the appropriate location on each reflector unit and then a nut 58 may be screwed onto the screw to secure the attachment. Tube 52 also serves as a conduit for receiving therethrough electrical leads 42 and 74. A smaller metal tube 88, exteriorly threaded at each end, passes through the tube 52 in order that the leads 42 and 74 may be shielded from the radar field while passing through tube 52. Nuts 58 are used to secure the attachment.

A power supply 68, such as a 12-volt battery, provides power for the analyzer 10. An electrical lead 70 provides power to the Doppler radar unit 12, a lead 72 provides power to the CPU 26, and a lead 74 provides power to the microphone circuit board 24 in the sub-reflector assembly 46.

Referring now to FIG. 3, an example of placement and operation of the monitor for use in monitoring aircraft traffic is shown. The depicted aircraft monitor is placed off one end of a runway 100, between about 300 and 500 feet beyond the end of the runway, and a distance of 4 feet or more above the runway elevation. A major requirement for placement of the monitor is that it be below the specified glide slope 94 for that particular runway. The monitor is aimed so that its extended central axis 96 defines an angle of between about 1° and 2° with the ground level of the runway thereby reducing the occurrence of ground reflections. In operation the monitor takes data of a target aircraft 102 using the runway 100. The data may be dealt with in a variety of ways, for example, the data acquired and analyzed by the CPU 26 of FIG. 1 can be stored and later downloaded into a controller and temporary storage unit and then transferred to a personal computer for report generation. In this manner, the monitor does not have to be taken out of service to allow the retrieval of the data.

With reference to FIG. 4, there is depicted one embodiment of certain superstructure for mounting the several components of the present monitor. Specifically, the depicted superstructure comprises a platform 110 supported generally horizontally in spaced relationship the ground 112 or other supporting surface as by a plurality of legs 114 which preferably are electrically isolating. As shown, several of the components of the monitor are contained within a housing 86 which is in turn suspended as by a swivel connection 108 or the like to the underside 106 of the platform 106. In this manner, the components of the monitor are protected from the direct rays of sunlight, and or other weather elements. In one embodiment, there is provided a skirt 104, of a material such as canvas or the like, which surrounds the perimeter of the platform and drapes therefrom to a location spaced above the ground 112 to provide further protection from the elements. As necessary, portion(s) of the skirt are cutaway to permit the uninhibited passage of radar radiation and/or sound waves to and from the monitor, or a radar and sound transparent window is provided therein.

It is anticipated that the monitor 10 is capable of many modifications and substitutions which would not depart from the scope of the claims which follow. For example, the monitor could be used to count and profile highway traffic as opposed to air traffic. Therefore, the previous description of a preferred embodiment was by way of illustration and not of limitation.

What is claimed is:

1. An apparatus for counting an and analyzing air traffic comprising at least one individual type of aircraft generating sound and conducting one of a plurality of possible flight operations at an airport comprising:
    radar means for generating and propagating radar radiation of a predetermined wavelength to be directed towards a target and for converting any doppler-shifted radar radiation reflected by said target into first electronic signals corresponding to said reflected doppler radiation;
    reflector means having a focus for directing said radar radiation generated by said radar means toward target air traffic conducting flight operations and for receiving reflected doppler radar radiation reflected by said target air traffic and simultaneously for receiving sound generated by said air traffic conducting flight operations wherein said reflector means further comprises:
    a parabolic primary reflector having an aperture located at its center through which radar radiation may pass, operated at its focus as to sound, and operated in a Cassegrainian mode as to radar radiation, for directing radar radiation towards a target aircraft and for simultaneously receiving reflected doppler radiation and sound; and
    a hyperbolic sub-reflector having a front surface and a rear surface located between said primary reflector and the focus of said primary reflector, for directing radar radiation emanating from said aperture in said primary reflector toward said primary reflector and for directing received reflected doppler radiation from said primary reflector toward said aperture in said primary reflector, said hyperbolic sub-reflector being constructed as to be transmissive of sound;
    microphone means for converting said received sound into a second electronic signal corresponding to said received sound; and
    analyzer means for analyzing said first and second electronic signals to determine a plurality of parameters of said air traffic conducting flight operations at said airport.

2. The apparatus of claim 1 wherein the hyperbolic sub-reflector has a plurality of holes drilled through the thickness thereof, said holes having a diameter smaller than the diameter of a circular wave guide which would transmit the wavelength of said doppler radar radiation.

3. The apparatus of claim 1 wherein the doppler radiation propagation means partially extends through the aperture of the primary reflector.

4. The apparatus of claim 1 wherein said microphone means comprises a condenser microphone located at the focus of the primary reflector.

5. The apparatus of claim 1 wherein said microphone means comprises a noise cancelling microphone system.

6. The apparatus of claim 5 wherein said noise cancelling microphone system comprises:
    a first microphone, located at the focus of the parabolic primary reflector and facing the primary reflector, for generating an electrical output signal corresponding to received sound;
    a second microphone, offset from the first microphone and facing away from the primary reflector, for generating an electrical output signal corresponding to received sound; and
    amplifier means having as inputs the outputs of first and second microphones whereby when the output of the first and second microphones are substantially the same output of the amplifier is minimized and when the output of the first microphone is substantially greater than that of the second microphone the output of the amplifier primarily reflects the output of the first microphone.

7. The apparatus of claim 1 wherein one of the plurality of parameters determined is the total number of individual aircraft comprising the air traffic during a predetermined time period.

8. The apparatus of claim 1 wherein one of the plurality of parameters determined is the type of flight operation being conducted by each individual aircraft comprising the air traffic during a predetermined time period.

9. The apparatus of claim 1 wherein one of the plurality of parameters determined is the direction of each individual aircraft comprising the air traffic during a predetermined time period.

10. The apparatus of claim 1 wherein one of the plurality of parameters determined is the type of each individual aircraft comprising the air traffic at during a predetermined time period.

11. An apparatus for counting and analyzing air traffic comprising at least one individual type of aircraft generating sound and conducting one of a plurality of possible flight operations at an airport comprising:
    radar radiation means for generating radiation of a predetermined wavelength to be propagated, for analyzing reflected doppler-shifted radar radiation so generated, and for providing as output, an electrical radar signal corresponding to the data generated by said analysis;

a conical microwave feedhorn for propagating radar radiation generated by the radar radiation means and for directing reflected doppler radar radiation into said doppler radar radiation means;

a parabolic primary reflector having an aperture located at its center and a focus for directing a collimated beam of radar radiation toward a target aircraft and for simultaneously receiving doppler radar radiation reflected by said target aircraft and sound generated by said target aircraft;

a hyperbolic, sound-transmissive, sub-reflector having a front surface and back surface and a plurality of holes extending through the thickness thereof, said holes having a diameter less than that required to pass the predetermined wavelength of said radar radiation, and large enough to pass higher harmonics thereof, said sub-reflector located in front of and facing said primary reflector between said primary reflector and said focus, for directing radar radiation propagated from said microwave feedhorn to said primary reflector and for directing reflected radar radiation, received by said primary reflector, toward said microwave feedhorn;

a noise cancelling microphone system located at the focus of said primary reflector for converting the sounds generated by a target aircraft into an electrical audio signal corresponding to the sounds generated by said target aircraft, whereby sounds not generated by a target aircraft are minimized; and a central processing unit having as inputs said electrical radar signals and said electrical audio signals for analyzing said inputs and determining a plurality of parameters of said air traffic and operations at said airport.

12. The apparatus of claim 11 wherein the noise cancelling microphone system comprises:

a first microphone, located at the focus of the primary reflector and facing the primary reflector, for generating an output signal corresponding to received sound;

a second microphone, separated by a baffle from the first microphone and facing away from the primary reflector, for generating an output signal corresponding to received sound; and differential amplifier having as inputs the outputs of first and second microphones whereby when the output of the first and second microphones are substantially the same the output of the differential amplifier is minimized and when the output of the first microphone is substantially greater than that of the second microphone the output of the amplifier represents substantially the input from the first microphone.

13. A method for monitoring moving vehicular traffic comprising the steps of:

disposing a radar horn in the approximate center of as primary parabolic reflector with the horn oriented to direct pulsed microwaves from the horn and toward the focus of said parabolic reflector, disposing a hyperbolic reflector which is substantially impervious to microwave radiation and pervious to sound waves at a location between said primary parabolic reflector and the focus of said primary parabolic reflector said hyperbolic reflector being oriented such that its focus is on an imaginary line that extends from the center of said parabolic reflector and through the focus of said parabolic reflector, generating microwave radiation and directing the same from a location proximate the center of said primary parabolic reflector toward the focus of said primary parabolic reflector such that said microwaves strike the reverse surface of said hyperbolic reflector and are redirected back to said primary parabolic reflector, thence are redirected by said primary parabolic reflector away from said parabolic reflector in the form of a substantially collimated beam toward said moving vehicular traffic, receiving microwaves reflected from said moving vehicular traffic to said primary parabolic reflector and redirecting said received reflected microwaves to the reverse surface of said hyperbolic reflector, thence to said source of said microwaves located proximate to the center of said primary parabolic reflector, receiving sound waves from said moving vehicular traffic on the surface of said primary parabolic reflector and redirecting the same to a first microphone located proximate to the focus of said primary parabolic reflector, receiving at a further microphone sound waves omnidirectionally from sources within the environment of said moving vehicular traffic, including sound generated by said traffic, electronically subtracting said omnidirectional sound waves from those sound waves which emanate principally from said moving vehicular traffic to generate an electronic signal that is essentially representative of only those sound waves attributable to said moving vehicular traffic, electronically analyzing those microwaves reflected by said vehicular traffic employing the Doppler effect and establishing the speed and direction of movement of said moving vehicular traffic, electronically manipulating said sound waves attributable to said moving vehicular traffic and establishing at least one identifying feature of said moving vehicular traffic, and producing a record of said electronic determinations.

* * * * *

UNITED STATES PATENT AND TRADEMARK OFFICE
CERTIFICATE OF CORRECTION

PATENT NO. : 5,075,680
DATED : 12/24/91
INVENTOR(S) : John W.T. Dabbs It is certified that error appears in the above-identified patent and that said Letters Patent is hereby corrected as shown below:

In the Abstract, at line 3 from bottom after "the" delete -- Dopple -- and insert -- Doppler --.

In the Abstract, last line, after "the" and before "aircraft" insert -- target --.

Col. 6, line 67, after "of" 18 should not be bold.

Col. 10, at line 1, after "constructed" insert -- so --.

Col. 10, at line 25 and 26, after "the" delete -- parabolic primary -- and insert -- primary parabolic --.

Col. 9 and Col. 11, lines 54 and 5, after "a" delete "parabolic primary" and insert --primary parabolic--;
Col. 12, line 1, after "of" delete "as" and insert --a--.

Signed and Sealed this

Eighteenth Day of May, 1993

Attest:

MICHAEL K. KIRK

*Attesting Officer*     *Acting Commissioner of Patents and Trademarks*